May 11, 1937. H. SWAN Re. 20,362
RAZOR
Original Filed April 28, 1932 3 Sheets-Sheet 1
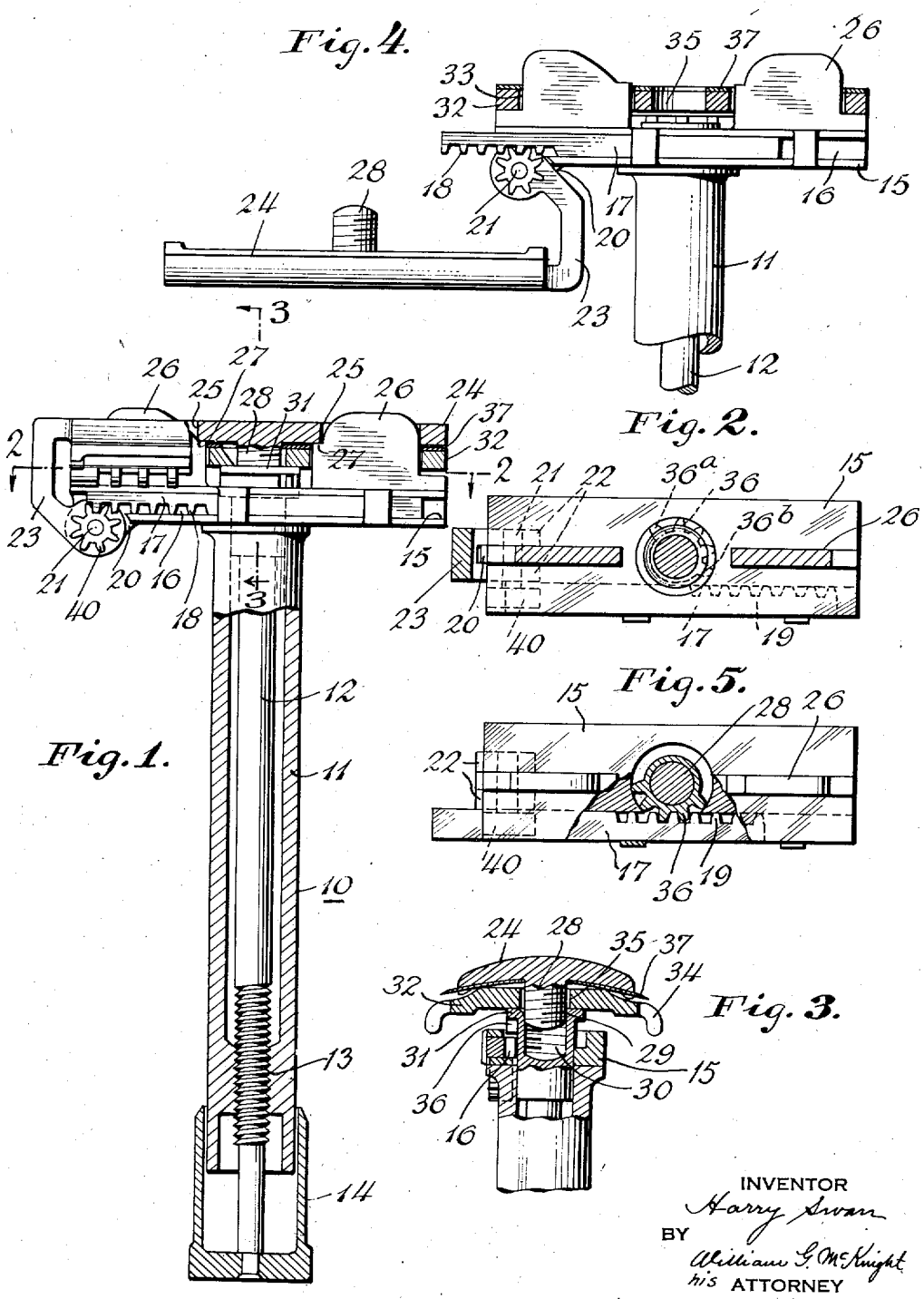
INVENTOR
Harry Swan
BY
William G. McKnight
his ATTORNEY May 11, 1937. H. SWAN Re. 20,362

RAZOR

Original Filed April 28, 1932 3 Sheets-Sheet 2

INVENTOR
Harry Swan
BY
William G. McKnight
his ATTORNEY

May 11, 1937. H. SWAN Re. 20,362

RAZOR

Original Filed April 28, 1932 3 Sheets-Sheet 3

INVENTOR
Harry Swan
BY
William G. McKnight
his ATTORNEY

Reissued May 11, 1937 Re. 20,362

UNITED STATES PATENT OFFICE 20,362

RAZOR

Harry Swan, New York, N. Y., assignor to Patents Incorporated, Wilmington, Del., a corporation of Delaware Original No. 1,888,747, dated November 22, 1932, Serial No. 607,905, April 28, 1932. Application for reissue June 10, 1933, Serial No. 675,300

32 Claims. (Cl. 30—61)

My invention relates to the razor art and especially to razors of the safety type.

In my copending application Serial No. 563,273 filed September 17, 1931, there are disclosed several forms of safety razor wherein a cap is permanently secured to a relatively stationary portion of the razor. A relatively rotatable portion of the handle is arranged to engage the cap for holding it in blade clamping position. The present invention provides means in a razor of this type for moving the cap into and out of blade clamping position by rotating the relatively rotatable portion of the handle. In this way the razor may be disassembled by simply turning the rotatable portion of the handle. This rotation first disconnects the handle from the cap and then causes the cap to be rotated about its hinged connection with the stationary portion of the razor. The razor may be assembled again by turning the rotatable portion in the opposite direction.

The nature and advantages of my invention will be apparent from the following description considered in connection with the accompanying drawings, which form a part of this specification and of which:

Fig. 1 is an elevational view, partially in cross-section, of a razor embodying my invention in one form;

Fig. 2 is a cross-sectional view of part of the razor taken in general on the line 2—2 of Fig. 1;

Fig. 3 is a cross-sectional view taken on the line 3—3 of Fig. 1;

Fig. 4 is an elevational view, partially in cross-section, of a portion of the device shown in Fig. 1, but with certain parts in a different position;

Fig. 5 is a top view, partially in cross-section, of a portion of the device shown in Fig. 4;

Figure 10:
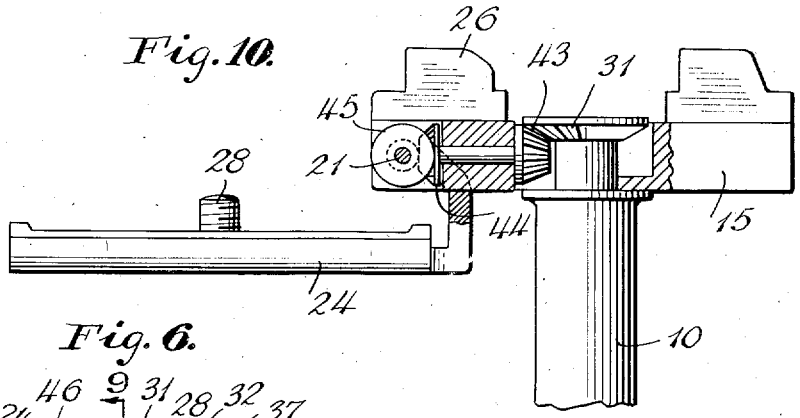
Fig. 10 is an elevational view, partially in cross-section, of the device shown in Fig. 6, but with certain of the parts in a different position.

Referring more particularly to Fig. 1, reference character 10 designates generally a handle which comprises a first part 11 and a second part 12, parts 11 and 12 being rotatable relative to each other. Part 11 is conveniently made in the form of a tube while part 12 is in the form of a rod or shaft extending through tube 11. Parts 11 and 12 are provided with a set of screw threads 13 so that the two parts have threaded engagement. A knob 14 is secured to one end of shaft 12 and is so located that it may be turned while tube 11 is held stationary.

Rigidly secured to the end of tube 11 is a base member 15. Base member 15 is formed with a groove or channel 16 for slidably supporting a rack 17. Rack 17 is formed with a set of teeth 18 on its lower face and another set of teeth 19 on its inner face.

An arm 20 is secured to the under side of base member 15 adjacent to one end thereof. Arm 20 is formed with an opening therethrough to receive a pin 21. Rigidly secured to pin 21 is forked end 22 of an arm 23. A gear 40 is also rigidly secured to pin 21, or may be secured directly to one prong of the forked end 22. The other end of arm 23 is secured to a cap 24. Cap 24 is provided with apertures or slots 25 which receive projections 26 carried by the base member 15. Projections 26 serve to position the cap, and shoulders 27 formed on the projections act as a stop for the cap and serve to maintain it parallel to the base member. A pin 28 is secured to the center of the under side of the cap. Pin 28 is provided with threads 29 which are of the same pitch as the threads comprising the set 13. The end of shaft 12, opposite to the end on which is secured knob 14, extends through a central opening in the base member 15. This end of shaft 12 is made hollow and provided with internal screw threads 30 adapted to engage threads 29 on pin 28. This end of shaft 12 is also provided with an integral collar or flange 31.

A guard member 32 is provided with openings 33 for receiving projections 26. The guard member is preferably formed with guard teeth 34 and has a central opening 35 through which pin 28 is adapted to pass. Opening 35 is small enough so that flange 31 on shaft 12 may not pass therethrough, but will bear against the under side of guard member 32.

Located on shaft 12 below flange 31 are several teeth 36. These teeth preferably do not extend all the way around the shaft in the form of a complete gear for reasons to be explained later. These teeth are adapted to engage teeth 19 on rack 17.

A razor blade 37 is adapted to be clamped between guard member 32 and cap 24. The razor blade is formed with suitable apertures to receive projections 26 and pin 28. The blade is preferably made of flexible material.

The operation of the razor above described is as follows:

Assume that the razor is in assembled position with a blade clamped in place between the cap and the guard, as is shown in Figs. 1 through 3. If it is desired to disassemble the razor for any purpose, such as to clean and dry the blade or to replace the blade, tubular part 11 of the handle 10 is held in one hand while shaft 12 is rotated by turning knob 14 with the other hand as though to unscrew it. This rotation causes shaft 12 to move downwardly with respect to part 11, as viewed in Fig. 1. This movement also causes shaft 12 to be unscrewed from pin 28. Inasmuch as the pitch of threads 13 and 29 and 30 is the same, the shaft 11 may be turned with respect to part 11 and pin 28 at the same time.

The teeth 36 on shaft 12 are so located that, at the instant shaft 12 becomes disengaged from pin 28, teeth 36 are somewhat higher than teeth 19 on rack 17 and the last tooth, designated **36*a* has just passed the teeth 19, the shaft being turned in a clockwise direction as seen in Figs. 2 and 5. Further rotation of shaft 12 causes it to move down still further and by the time the first tooth, designated 36*b* has come around to teeth 19, it is down far enough to engage one of these teeth. Further rotation of shaft 12 and teeth 36 causes rack 17 to move to the left, as viewed in Fig. 1. This movement causes gear 40, which engages teeth 18 on rack 17, to rotate in a counterclockwise direction. Inasmuch as gear 40 is rigidly secured to arm 23, either directly or through pin 21, cap 24 is caused to rotate with respect to base member 15 to the position shown in Fig. 4. In this position blade 37 and guard member 32** may be removed.

When it is desired to reassemble the razor, guard 32 and blade 37 are placed in proper position on base member 15 and knob 14 is turned in the opposite direction; that is as to screw knob 14 onto part 11. Teeth 36 being still in engagement with teeth 19 on rack 17, the rack is caused to move to the right and rotates gear 40 in a clockwise direction, as illustrated. This causes cap 24 to be rotated into blade clamping position. When cap 24 reaches this position tooth **36*b* disengages from teeth 19 and further rotation of shaft 12 causes threads 30 to engage threads 29 on the pin 28. By the time tooth 36*a* has come around to teeth 19, the shaft 12 has been raised sufficiently so that tooth 36*a* is above the teeth 19 and hence does not engage them. As knob 14 is turned, flange 31 is raised with the shaft 12 and forces guard member 32 upwardly and thus the blade 37 is clamped between the guard member and cap 24. Inasmuch as cap 24 is in engagement with shaft 12 by means of threads 29 and 30, the cap cannot be displaced by guard member 32 and blade 37** being forced up against it.

In Figs. 6 through 10, there is illustrated a somewhat modified embodiment of my invention. The razor comprising this embodiment consists of a handle 10 made up of a tubular part 11 and a shaft 12. Secured to one end of part 11 is a base member 15. Base member 15 supports a rotatable shaft 42 which is provided with a bevelled gear 43 at its inner end and another bevelled gear 44 at its outer end. A bevelled gear 45 meshes with gear 44 and is rigidly secured to pin 21 which is journalled in arms 41 secured to or integral with base member 15. The forked end 22 of arm 23 is also rigidly secured to pin 21. Cap 24, which is rigidly secured to arm 23 in this embodiment is not provided with openings therethrough, but is formed with recesses 46 in its under face. These recesses are adapted to receive projections 26 which, in this embodiment, are not as high as were the projections shown in the first embodiment. The central under side of cap 24 is provided with a pin 28 on which are formed threads 29 adapted to engage threads 30 formed in the hollow end of shaft 12. Shaft 12 and tubular part 11 have threaded engagement in this embodiment in the same manner as shown at 13 in Fig. 1.

A guard member 32 provided with apertures 33 is carried by base member 15. A blade 37 is adapted to be clamped between guard member 32 and cap 24.

A flange 31 is secured to the upper end of shaft 12 and bears against the under side of guard 32. On the under side of flange 31 is located a plurality of bevel gear teeth 47. Gear teeth 47 do not form a complete gear but comprise only a few teeth, as was the case with teeth 36 in the first embodiment.

Figure 6:
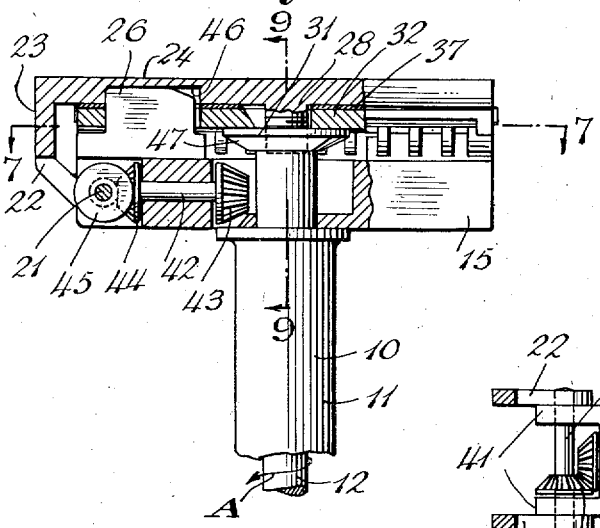
Fig. 6 is an elevational view, partially in cross-section, of another embodiment of my invention.
Figure 7:
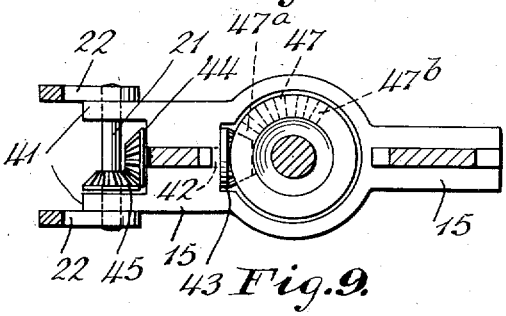
Fig. 7 is a cross-sectional view taken on the line 7—7 of Fig. 6.
Figure 8:
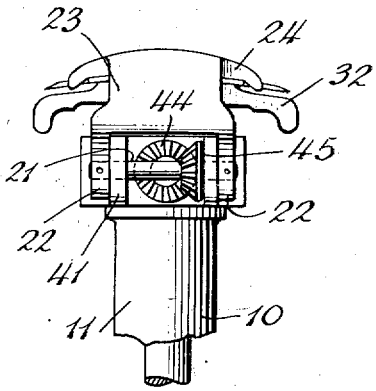
Fig. 8 is an end view of the device shown in Fig. 6.
Figure 9:
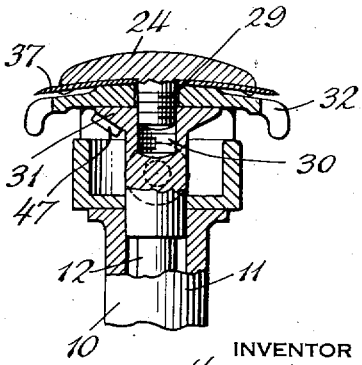
Fig. 9 is a cross-sectional view taken on the line 9—9 of Fig. 6.
Figure 14:
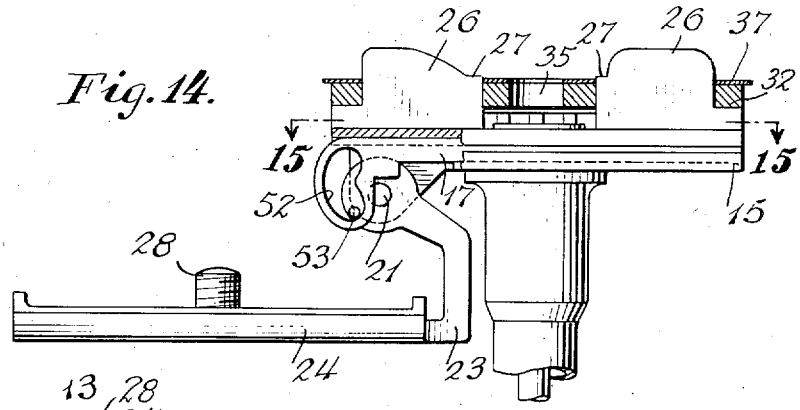
Fig. 14 is an elevational view partially in cross-section, of the device shown in Fig. 11, but with certain of the parts in a different position.

The operation of the device just described is as follows:

Assuming the razor to be in assembled position, as is shown in Fig. 6, rotation of shaft 12 causes the shaft to move downwardly, as indicated by the arrow A, with respect to tubular part 11 and with respect to pin 28. When the shaft has been turned far enough so that threads 29 and 30 are disengaged, teeth 47 engage teeth on bevelled gear 43 and cause shaft 42 to rotate. This rotation is transmitted through bevelled gears 44 and 45 to pin 21 which causes cap 24 to rotate with respect to base member 15. The cap is rotated to the position shown in Fig. 10. In this position the blade and guard may be removed. When it is desired to reassemble the razor, the blade and guard are placed in position on base member 15 and shaft 12 is turned in the opposite direction to that indicated by the arrow A. Inasmuch as teeth 47 are in engagement with bevelled gear 43 this causes rotation of shaft 42 and cap 24 is rotated until it comes to rest on projections 26. At this point teeth 47 disengage from bevelled gear 43 and further rotation of shaft 12 causes threads 29 and 30 to engage. Flange 31 forces guard 32 and blade 37 upwardly against cap 24, which is held from rotating due to the fact that threads 29 and 30 are in engagement.

Teeth 47 do not extent all the way around the upper end of shaft 12 for the same reason that teeth 36 did not extend all the way around. Hence, shaft 12 may be turned a portion of a turn and thus moved downwardly, between the time when last tooth **47*a* clears gear 43 and the time when first tooth 47*b* comes into engagement with gear 43. This allows for an appreciable overlapping before contact of tooth 47*b* with the teeth of gear 43. If teeth 47** were disposed all the way around shaft 12, they would at first just touch the ends of the teeth on gear 43 and might slip over them before the shaft had turned sufficiently to bring them down far enough to actually engage the teeth. This would cause unnecessary wear and the gears might possibly become jammed.

A further embodiment of my invention is illustrated in Figs. 11 through 15. In this embodiment the handle comprises a tubular part 11 and a shaft 12. One end of shaft 12 is provided with a knob 14 and the parts are formed with a set of threads 13 adapted to engage each other. Another set of threads 50 is formed on the parts 11 and 12. Set of threads 50 has a greater pitch than does set 13. These threads are so spaced on parts 11 and 12 that the threads of set 50 come into engagement immediately after the threads of set 13 have become disengaged. The result is that when the shaft 12 is being turned so as to lower it with respect to tubular part 11, the shaft moves downwardly a certain distance with relation to part 11 for each turn of the handle while threads 13 are in engagement, and moves a greater distance for each turn when threads 50 come into engagement. Obviously, threads 13 and threads 50 should not be in engagement at the same time due to the fact that they have a different pitch.

A base member 15 is rigidly secured to one end of tubular part 11. Base member 15 is formed with a slot 16 in which is slidably positioned a rack 17. Rack 17 is provided with a recess 51. One end of rack 17 is formed with an internal cam surface 52 which preferably has the outline disclosed in Figs. 11 and 14.

Base member 15 is formed with an arm 20 having a circular opening therethrough which receives a pin 21. Pin 21 supports the forked end 22 of an arm 23 which is rigidly secured to a cap 24. One of the prongs of the forked end 22 of arm 23 is provided with a pin 53 which is adapted to contact the cam surface 52 of rack 17.

Cap 14 is formed with recesses 25 for receiving projections 26 carried by base member 15. The cap is also provided with a centrally located pin 28 having threads 29 formed thereon. Threads 29 are adapted to engage threads 30 formed in the tubular end of shaft 12. Threads 29 and 30 have the same pitch as do the threads comprising the set 13.

The upper end of shaft 12 is formed with a flange 31. Located below flange 31 is a single tooth 54 which is adapted to engage recess 51 formed in rack 17. In place of the single recess 51 and single tooth 54 several teeth could be formed on both the shaft 12 and rack 17, as shown in the embodiment illustrated in Figs. 1 through 5.

The various parts are so proportioned and spaced that threads 29 and 30 become disengaged at the same time that the threads making up the set 13 become disengaged. In other words, during the time while the threads of set 50 are in engagement, the threads of the set 13 and threads 29 and 30 are out of engagement.

Figure 11:
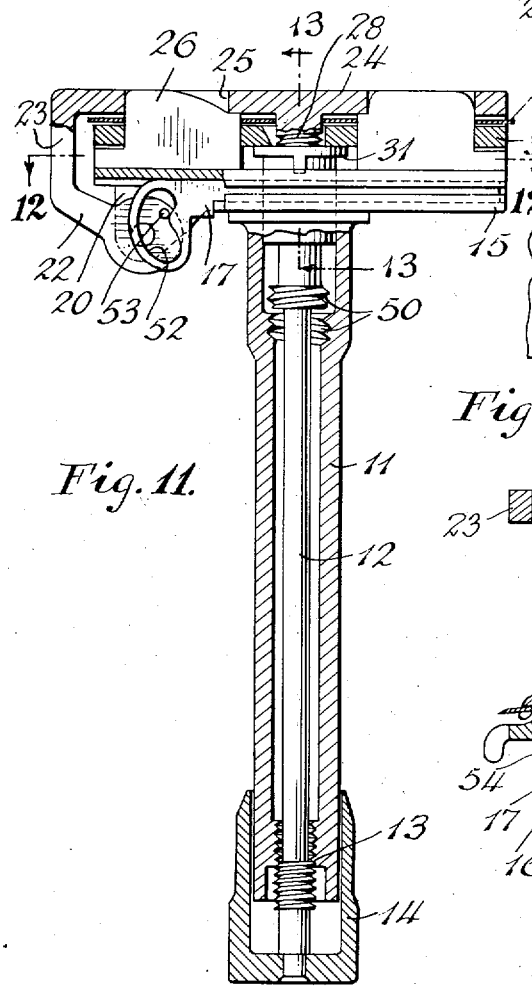
Fig. 11 is an elevational view, partially in cross-section, of still another embodiment of my invention.

The operation of this embodiment is as follows:

Assume the razor to be in assembled position as shown in Fig. 11. Rotation of shaft 12 in the proper direction causes it to move downwardly with respect to tubular part 11, as viewed in Fig. 11. The distance which the shaft moves for each complete turn thereof is determined by the pitch of the threads making up set 13. At the same time, shaft 12 is being unscrewed from pin 28. When the shaft has been turned sufficiently so that the threads of the set 13 become disengaged, threads 29 and 30 also become disengaged. Further rotation of shaft 12 causes the threads comprising the set 50 to become engaged. At this point tooth 54 is in the position shown in Fig. 15, that is, it has just passed over rack 17. When the shaft 12 is rotated from this position with threads 50 in engagement, the shaft moves downwardly further than it would had threads 13 remained in engagement, due to the greater pitch of threads 50. Hence, by the time tooth 54 is turned to the position shown in Fig. 12, where it is about to engage recess 51 in rack 17, the tooth is further down than it would have been if threads 50 of the greater pitch had not been employed. Hence, tooth 54 has better engagement than it otherwise would have had, and better engagement than does the first tooth 36b shown in Fig. 2.

Figure 12:
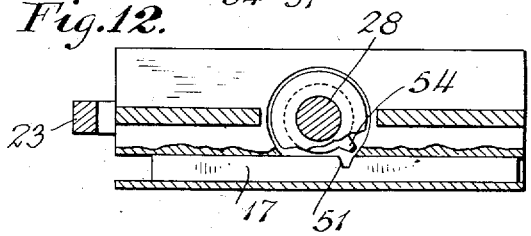
Fig. 12 is a cross-sectional view taken on the line 12—12 of Fig. 11.
Figure 13:
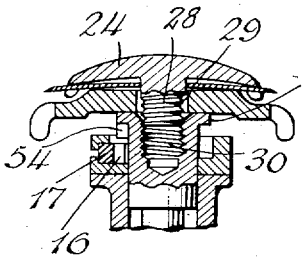
Fig. 13 is a cross-sectional view taken on the line 13—13 of Fig. 11.

Further rotation of shaft 12 from the position shown in Fig. 12 causes rack 17 to move to the left, as viewed in Fig. 11. This movement causes cam surface 52 to be pressed against pin 53. This causes pin 53 to move to the left and, inasmuch as it is mounted on arm 23 which is pivoted on pin 21, cap 24 is rotated to the position shown in Fig. 14. In this position the blade 37 and the guard member 32 may be removed.

When it is desired to reassemble the razor, guard 32 and blade 37 are put in place on base member 15 and shaft 12 is rotated in the opposite direction. This causes rack 17 to move to the right, as viewed in Fig. 14. This causes the lower left hand portion of the cam surface 52 to press against pin 53 with the result that the pin slides up on this surface and causes arm 23 and cap 24 to rotate in a clockwise direction about pin 21 until it comes to rest on shoulders 27 of projections 26.

Figure 15:
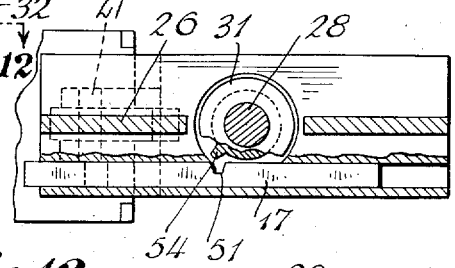
Fig. 15 is a cross-sectional view taken on the line 15—15 of Fig. 14.

At this point tooth 54 leaves recess 51 and by the time it has come back to the position shown in Fig. 15, threads 50 have become disengaged and threads 13 have become engaged. At the same time that threads 13 become engaged, threads 29 and 30 also become engaged. Further rotation of the shaft 12 causes it to move upwardly with respect to tubular part 11 and flange 31 forces guard member 32 and blade 37 upwardly against cap 24, thus clamping the blade between the cap and the guard member.

It will be apparent that the arrangement of threads 13 and 50 disclosed in the embodiment illustrated in Figs. 11 through 15 may be employed with equal advantage in the other two embodiments illustrated.

It will be noted that, in each of the embodiments, the hinge comprising arm 20, pin 21 and arm 23 is located underneath the base member 15. This hinge could be located beyond the end of the base member, that is directly below the vertical part of arm 23. However, an advantage is gained by locating it in the position shown. This advantage is that the cap is better balanced the nearer the hinge is to the center of the cap. Obviously, if the hinge were located far enough under the cap, there would be as much weight on one side of the hinge as on the other and very little force would be required to rotate the cap. By locating the hinge some distance inwardly from the end of the cap, the cap is balanced to some extent. Besides this, the hinge so located is protected from injury and results in the razor having a neater appearance.

While the guard in the embodiments illustrated is not of the reversible type, it is obvious that a reversible guard, such as is disclosed in my above identified copending application, could be employed without in any way departing from the spirit of this invention.

While I have shown and described three embodiments of my invention it is to be understood that they are for illustrative purposes only and are not to be considered as limiting the scope of my invention, which is to be determined by the appended claims viewed in the light of the prior art.

What I claim is:

1. In a safety razor of the double edged flexible blade type, a cap supporting member, a cap rotatably mounted with respect to said member, a guard having an operative position with respect to said member, cap rotating means, and a member having a given path of movement with respect to said cap supporting member engageable successively with the cap rotating means and with said cap for first rotating the cap into blade clamping position with respect to said guard and then holding the cap in said position.

2. In a safety razor of the double edge flexible blade type, a base member, a cap pivoted at one end to the base member, a guard between the base member and the cap, cap rotating means, and a member engageable successively with the cap and the cap rotating means.

3. In a razor, a handle comprising a first part and a second part, said parts being relatively rotatable, a base member secured to said first part, a cap hinged to said base member, and cap rotating means, one of said parts upon rotation being engageable successively with the cap rotating means and with the cap.

4. In a razor, a handle comprising a first part and a second part, said parts being relatively rotatable, a base member secured to said first part, a cap hinged to said base member, a motion transmitting member movably supported by said base member, means on said second part for engaging and moving said motion transmitting member upon relative rotation of said parts, means secured to said cap for engaging said motion transmitting member so that movement thereof causes rotation of said cap with respect to said base member, and means on said cap for direct engagement with said second part.

5. In a razor, a handle comprising a first part and a second part, said parts being relatively rotatable, a base member secured to said first part, a cap hinged to said base member, a guard having guard teeth on opposite edges supported by said base member, a double edged blade adapted to be clamped between said cap and said guard, a rack slidably supported by said base member, said rack having one or more teeth thereon, said second part having one or more teeth formed thereon for engagement with said rack, and means secured to said cap for engaging said rack so that movement of said rack causes rotation of said cap with respect to said base member.

6. In a razor, a handle comprising a first part and a second part, said parts being relatively rotatable, a base member secured to said first part, a cap hinged to said base member, a rack slidably supported by said base member, said rack having one or more teeth formed thereon, said second part having one or more teeth formed thereon for engagement with said rack, said rack having a cam surface, and means secured to said cap for contacting said cam surface so that movement of said rack causes rotation of said cap with respect to said base member.

7. In a razor, a handle comprising a first part and a second part, said parts being relatively rotatable, a base member secured to said first part, a cap hinged to said base member, a rack slidably supported by said base member, said rack having one or more teeth formed thereon, said second part having one or more teeth formed thereon for engagement with said rack, said rack being formed with an internal cam surface, and means on said cap for contacting said cam surface so that movement of said rack in one direction causes rotation of said cap in one direction with respect to said base member and movement of said rack in the opposite direction causes rotation of said cap in the opposite direction.

8. In a razor, a handle comprising a first part and a second part, said parts being relatively rotatable, a base member secured to said first part, a cap rotatably secured to said base member, a guard having guard teeth on opposite edges supported by said base member, a double edged blade adapted to be clamped between said cap and said guard, a gear secured to said cap at the axis of rotation thereof, a rack slidably supported by said base member, said rack having one or more teeth, said gear having engagement with teeth on said rack, and said second part having teeth formed thereon for engagement with teeth on said rack.

9. In a razor, a handle comprising a first part and a second part, said parts being relatively rotatable, a base member secured to said first part, a cap rotatably secured to said base member, a gear secured to said cap at the axis of rotation thereof, said second part having teeth formed thereon, a shaft rotatably carried by said base member, a gear secured to said shaft and meshing with the gear secured to the cap, and a gear secured to said shaft for engagement with the teeth on said second part.

10. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, and means operable upon rotation of said second part while disengaged from said pin for rotating said cap with respect to said base member.

11. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a motion transmitting member movably supported by said base member, means on said second part for engaging and moving said motion transmitting member upon rotation of said second part while disengaged from said pin, and means on said cap for engaging said motion transmitting member so that movement thereof causes rotation of said cap with respect to said base member.

12. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a rack slidably supported by said base member and having one or more teeth, said second part having one or more teeth and being positioned so as to engage said rack when said second part is disengaged from said pin, and means on said cap for engaging said rack so that movement of said rack causes rotation of said cap with respect to said base member.

13. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a rack slidably supported by said base member and having one or more teeth, said second part having one or more teeth and being positioned so as to engage the teeth on said rack when said second part is disengaged from said pin, said rack having a cam surface, and means secured to said cap for contacting said cam surface so that movement of said rack causes rotation of said cap with respect to said base member.

14. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a rack slidably supported by said base member and having one or more teeth, said second part having one or more teeth and being positioned so as to engage said rack when said second part is disengaged from said pin, said rack having an internal cam surface, and means on said cap for contacting said cam surface so that movement of said rack in one direction causes rotation of said cap in one direction with respect to said base member and movement of said rack in the opposite direction causes rotation of said cap in the opposite direction.

15. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a gear secured to said cap at the axis of rotation thereof, a rack slidably supported by said base member and having one or more teeth, said gear having engagement with said rack, and said second part having teeth formed thereon and being movable so as to engage said rack when said second part is disengaged from said pin.

16. In a razor, a handle comprising a first part having threads formed thereon and a second part having threads for engagement with the first-mentioned threads, a base member secured to said first part, a cap rotatably secured to said base member, a pin secured to said cap and having threads formed thereon, one end of said second part being formed with threads for engaging the threads on said pin, the location and axial extent of the threads on said pin being such with respect to the threads on said parts which engage with each other that said second part may be disengaged from said pin while still engaged with said first part, a gear secured to said cap at the axis of rotation thereof, a shaft rotatably carried by said base member, a gear secured to said shaft and meshing with the gear on said cap, another gear secured to said shaft, and said second part having teeth and being movable so as to engage the last-mentioned gear when said second part is disengaged from said pin.

17. In a razor, a handle comprising a first part and a second part, two sets of threads on said parts for providing threaded engagement between the two parts, the pitch of one set being different than the pitch of the other set, said sets being so spaced that, upon relative rotation of the two parts, the threads of one set come into engagement after the threads of the other set have become disengaged, a base member secured to said first part, a cap rotatably secured to said base member, a pin secured to said cap and having formed thereon threads of the same pitch as the threads of the set having the smaller pitch, one end of said second part being formed with threads for engaging the threads on said pin, all of the threads of the smaller pitch being so spaced as to engage and disengage at the same time, and means operable upon rotation of said second part when the threads having the larger pitch are interengaged for rotating said cap with respect to said base member.

18. In a razor, a handle comprising a first part and a second part, two sets of threads on said parts for providing threaded engagement between the two parts, the pitch of one set being different than the pitch of the other set, said sets being so spaced that, upon relative rotation of the two parts, the threads of one set come into engagement after the threads of the other set have become disengaged, a base member secured to said first part, a cap rotatably secured to said base member, a pin secured to said cap and having formed thereon threads of the same pitch as the threads of the set having the smaller pitch, one end of said second part being formed with threads for engaging the threads on said pin, all of the threads of the smaller pitch being so spaced as to engage and disengage at the same time, a motion transmitting member movably supported by said base member, means on said second part for engaging and moving said motion transmitting member upon rotation of said second part when the threads having the larger pitch are interengaged, and means on said cap for engaging said motion transmitting member so that movement thereof causes rotation of said cap with respect to said base member.

19. In a razor, a handle comprising a first part and a second part, two sets of threads on said parts for providing threaded engagement between the two parts, the pitch of one set being different than the pitch of the other set, said sets being so spaced that, upon relative rotation of the two parts, the threads of one set come into engagement after the threads of the other set have become disengaged, a base member secured to said first part, a cap rotatably secured to said base member, a pin secured to said cap and having formed thereon threads of the same pitch as the threads of the set having the smaller pitch, one end of said second part being formed with threads for engaging the threads on said pin, all of the threads of the smaller pitch being so spaced as to engage and disengage at the same time, a rack slidably supported by said base member, said rack having one or more teeth thereon, said second part having one or more teeth formed thereon and so located as to engage said rack when the threads having the larger pitch are interengaged, and means on said cap for engaging said rack so that movement of said rack causes rotation of said cap with respect to said base member.

20. In a razor, a handle comprising a first part and a second part, two sets of threads on said parts for providing threaded engagement between the two parts, the pitch of one set being different than the pitch of the other set, said sets being so spaced that, upon relative rotation of the two parts, the threads of one set come into engagement after the threads of the other set have become disengaged, a base member secured to said first part, a cap rotatably secured to said base member, a pin secured to said cap and having formed thereon threads of the same pitch as the threads of the set having the smaller pitch, one end of said second part being formed with threads for engaging the threads on said pin, all of the threads of the smaller pitch being so spaced as to engage and disengage at the same time, a rack slidably supported by said base member, said rack having one or more teeth thereon, said second part having one or more teeth formed thereon and so located as to engage said rack when the threads having the larger pitch are interengaged, said rack being formed with a cam surface, and means on said cap for contacting said cam surface so that movement of said rack causes rotation of said cap with respect to said base member.

21. In a safety razor, a base member, a cap pivoted at one end to the base member, a guard between the base member and the cap, a double edged flexible blade adapted to be clamped between the guard and the cap, cap rotating means, and a member engageable successively with the cap rotating means and with the cap for first rotating the cap into blade clamping position and then holding the cap in said position.

22. In a razor, a handle comprising a first part and a second part, said parts being relatively rotatable, a base member secured to said first part, a cap hinged to said base member, a rack slidably supported by said base member, said rack having one or more teeth thereon, said second part having one or more teeth formed thereon for engagement with said rack means secured to said cap for engaging said rack so that movement of said rack causes rotation of said cap with respect to said base member, and means on said cap for direct engagement with said second part.

23. In a razor, a handle comprising a first part and a second part, said parts being relatively rotatable, a base member secured to said first part, a cap hinged to said base member, a rack slidably supported by said base member, said rack having one or more teeth formed thereon, said second part having one or more teeth formed thereon for engagement with said rack, said rack having a cam surface, means secured to said cap for contacting said cam surface so that movement of said rack causes rotation of said cap with respect to said base member, and means on said cap for direct engagement with said second part.

24. In a razor, a handle comprising a first part and a second part, said parts being relatively rotatable, a base member secured to said first part, a cap rotatably secured to said base member, a gear secured to said cap at the axis of rotation thereof, a rack slidably supported by said base member, said rack having one or more teeth, said gear having engagement with teeth on said rack, said second part having teeth formed thereon for engagement with teeth on said rack, and means on said cap for direct engagement with said second part.

25. In a razor, a handle comprising a first part and a second part, said parts being relatively rotatable, a base member secured to said first part, a cap rotatably secured to said base member, a gear secured to said cap at the axis of rotation thereof, said second part having teeth formed thereon, a shaft rotatably carried by said base member, a gear secured to said shaft and meshing with the gear secured to the cap, a gear secured to said shaft for engagement with the teeth on said second part, and means on said cap for direct engagement with said second part.

26. In a razor, a handle comprising a first part and a second part, said parts being relatively rotatable, a base member secured to said first part, a cap, a hinge for rotatably mounting said cap on said base member, said hinge being located beneath, and inwardly from one end of said base member, and a guard supported by said base member, said second part being adapted upon rotation to move said guard toward said cap for clamping a blade therebetween.

27. In a razor, a handle comprising a first part and a second part, said parts being relatively rotatable, a base member secured to said first part, a cap, a hinge for rotatably mounting said cap on said base member, said hinge being located beneath, and inwardly from one end of, said base member, a guard supported by said base member, and cap rotating means, said second part being engageable with said cap rotating means and with said guard for rotating said cap and moving said guard toward said cap for clamping a blade between said guard and said cap.

28. In a razor, a handle comprising a first part and a second part, said parts being relatively rotatable, a base member secured to said first part, a cap, a hinge for rotatably mounting said cap on said base member, said hinge being located beneath, and inwardly from one end of, said base member, a motion transmitting member movably supported by said base member, means on said second part for engaging and moving said motion transmitting member upon relative rotation of said parts, means secured to said cap for engaging said motion transmitting member so that movement thereof causes rotation of said cap with respect to said base member, and a guard supported by said base member, said second part being adapted upon rotation to move said guard toward said cap for clamping a blade therebetween.

29. A safety razor of the double edge flexible blade type including a pivotally mounted cap, a handle member, a first element movable on turning said handle member in a given direction to swing the cap into blade clamping position and a second element movable on further turning said handle member in the same direction to curve the blade into shaving position.

30. A safety razor of the flexible blade type having a swinging blade-shaping cap, an operating device, a train of mechanism operated by movement of said operating device to swing said cap into blade clamping position, and a second train of mechanism automatically brought into action thereafter and operated by a greater movement of said operating device to clamp the blade.

31. A safety razor of the flexible blade type having a swinging blade-shaping cap, a handle member, an operating member movable with respect thereto, a train of mechanism operated by movement of said operating member to swing said cap into blade clamping position, and a second train of mechanism automatically brought into action thereafter and operated by a greater movement of said operating member to clamp the blade.

32. A safety razor of the flexible blade type having a swinging blade-shaping cap, a handle member, an operating member rotatable with respect thereto, a train of mechanism operated by rotation of said operating member to swing said cap into blade clamping position, and a second train of mechanism automatically brought into action thereafter and operated by a greater rotation of said operating member to clamp the blade.

HARRY SWAN.